UNITED STATES PATENT OFFICE.

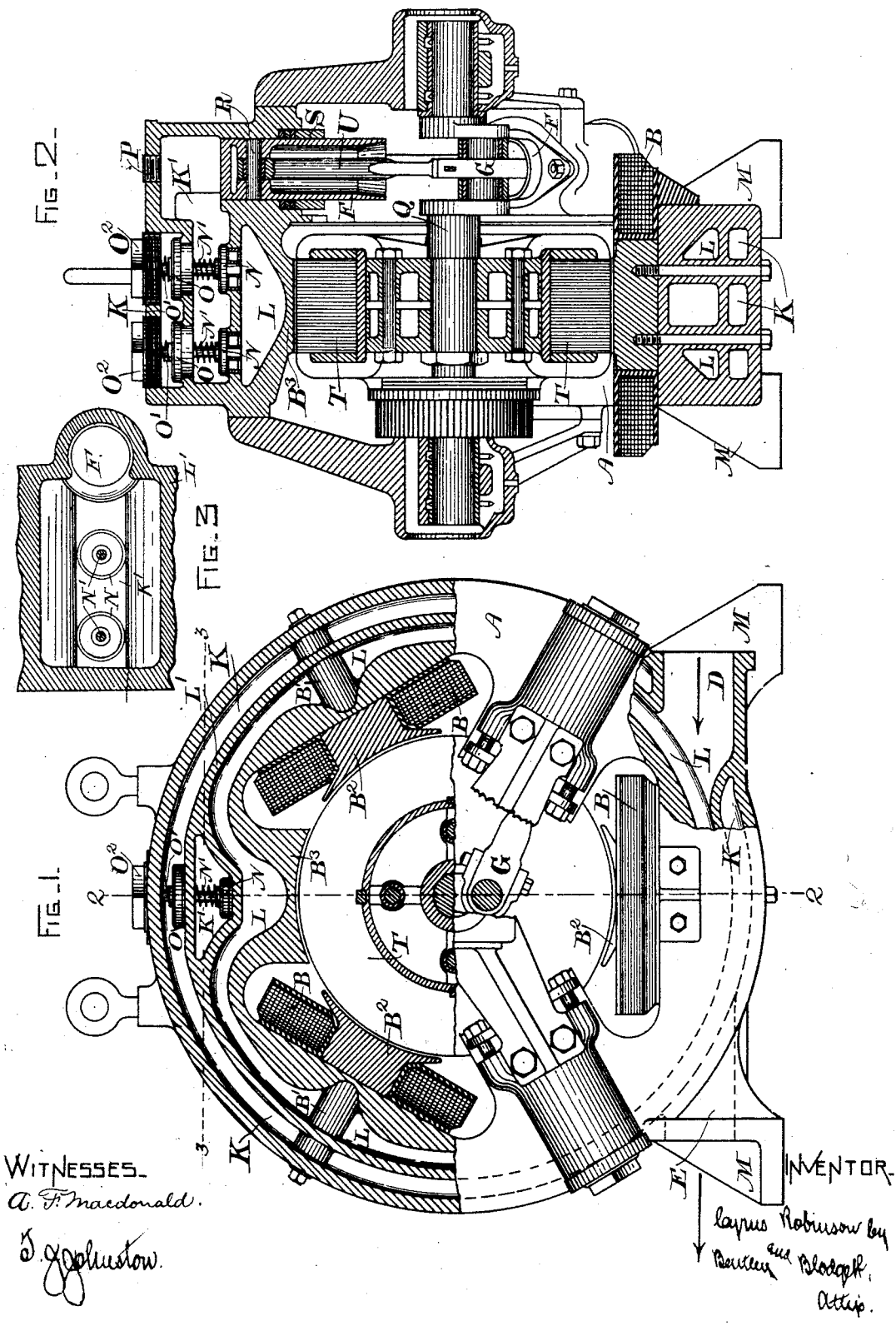

CYRUS ROBINSON, OF LYNN, ASSIGNOR TO THE GENERAL ELECTRIC COMPANY, OF BOSTON, MASSACHUSETTS.

ELECTRICALLY-OPERATING PUMP.

SPECIFICATION forming part of Letters Patent No. 516,840, dated March 20, 1894.

Application filed October 11, 1893. Serial No. 487,825. (No model.)

*To all whom it may concern:*

Be it known that I, CYRUS ROBINSON, a subject of the Queen of Great Britain, residing at Lynn, in the county of Essex and State of Massachusetts, have invented a certain new and useful Improvement in Electrically-Operating Pumps, of which the following is a specification.

My invention relates to pumping apparatus driven by electric power and has for its object to provide a compact apparatus of great power for its size and in which the circulation of the fluid acts to cool the field-magnets and pole-pieces, and by providing a cool surface adjacent to the armature, to keep it also cool, thus increasing the efficiency of the electric part of the apparatus; I also adopt an improved shape for the circular casing surrounding the pump, whereby I improve the magnetic circuit and increase the strength of the field, the casing forming the yoke between the pole-pieces of the apparatus.

In the accompanying drawings which show an embodiment of my invention and which are hereby referred to and made part of this specification, Figure 1 is a side elevation partly in section of my improved pumping apparatus, and Fig. 2 is a sectional view upon the line 2, 2, of Fig. 1 looking to the right, showing only one of the field magnets and pumping cylinders. Fig. 3 is a section upon the line 3—3 of Fig. 1.

Like letters denote like parts in all the views.

In the drawings A is the circular casing, which as shown, may be made in two or more parts according to the size of the pump and convenience in manufacture.

B, B, B, are the field magnet coils of which there are three.

B', B', B' are extensions from the field-magnet cores passing through the inner and outer flanges of the circular casing and tightly fitting their seats in such flanges, being secured in place by bolts and nuts or any other proper mechanical device.

$B^2$, $B^2$, $B^2$ are the pole-pieces extending from the field-magnet cores, which may or may not be laminated, as commonly practiced. The exterior casing, or the interior part thereof, is formed so as to make consequent pole pieces, $B^3$, &c., only one of which is shown in Fig. 1, which act to improve the magnetic circuit and strengthen the field.

T is the armature of the electric motor, which is of ordinary form having a laminated core if preferred; any good electrical construction may be employed, which forms no part of my invention, except that it is preferred to have its conductors upon the outside of the core as far as possible, and in as close proximity as possible to the pole pieces. The casing is provided with an intake D, communicating with an internal channel L, separated by the flange L' from an external channel K, which latter channel communicates with the exit E of the pump. Between the two chambers there are arranged valve-chambers K'; within these chambers two valves N, N, are provided, seating upon valve ports in the customary manner and held down by the springs N', N' upon their spindles; this pair of valves in each chamber controls the ingress of the water from the internal channel L. A second pair of valves controls the egress from the valve chamber K' to the external chamber K; these valves are marked O, O, and have springs O', O', to force them to their seats, being provided also with adjusting nuts $O^2$, $O^2$, which may be removed to get access to the valves when the pump needs cleaning. I provide also near each of the pistons a plug P by which I may inspect the interior of the pump without deranging the valve gear. Connected to the shaft Q of the motor armature are three crank rods acting upon a common crank, only one of which, G, is shown, each of which is connected to a piston rod U, journaled upon the pin R of the piston F; a packing gland S keeps each piston tight. The whole apparatus stands upon a base M, M, and the intake and exit respectively are connected as usual to the pipes supplying and carrying away the water or other fluid.

The operation of the pump is as follows: When the water enters the intake D it passes through the interior channel L to the valves; as each piston is drawn out its appropriate valves N, N, rise and permit an amount of water equal to the displacement of the piston stroke to enter the valve chamber K'; as the piston then moves in the opposite direction it forces this water out through the valves O, O, into the exterior channel K from whence it passes around to the exit E, communicating therewith. In its circulation through the two channels of the casing it passes around the projecting cores of the field-magnets B', B', &c., and through the interior of the consequent pole-pieces B³, &c., and serves to keep them cool, the heat being conducted away from the pole pieces and by radiation from the armature, and passing off in the water. By the rapid alternations of the piston strokes I obtain a substantially constant flow and the whole apparatus is compact and easily handled and run.

I do not show in the drawings the electric connections or the resistances adapted to regulate the speed of the motor, because all this is well known in the art, and forms no part of my invention.

Having thus described my invention, what I claim as new, and desire to protect by Letters Patent of the United States, is—

1. The combination of an electric motor driving a pumping apparatus, the casing of which forms a part of the magnetic circuit of the motor such casing being provided with channels and valve mechanisms adapted to assist the circulation of the fluid from the pump.

2. The combination of a casing having interior and exterior channels, field-magnets of an electric motor connected by such casing and having field magnet cores projecting through the channels, an armature for such motor, and pumping mechanism operated thereby; whereby the circulation of the fluid through the casing acts to cool the field magnets of the motor and increase the efficiency.

3. The combination of a casing forming a magnetic yoke, field-magnets of an electric motor connected thereby, and a rotating armature driving pumping mechanism adapted to force water or other fluid through the casing; such casing being formed with interior and exterior channels, and with consequent pole pieces, as B³, between the field magnets, all as described and set out herein.

4. A casing for an electrically operated pump mechanism formed with interior channels communicating the one with the intake and the other with the exit, valve mechanisms arranged in such casing between the channels, reciprocating pistons operated by a rotating electric armature, arranged to open and close such valve mechanisms, and field-magnets secured to the casing and projecting through the channels therein.

5. A casing for an electrically operated pump mechanism formed with interior channels and projecting consequent pole-pieces as B³, all adapted to form a magnetic yoke for field-magnet cores, as B', B', &c.

6. In combination, a rotating armature operating reciprocating pistons, a casing containing interior and exterior channels, valve mechanisms between the channels adapted to respond to the stroke of the pistons, an intake communicating with one of such channels, an exit communicating with the other and field-magnets secured to the casing, substantially as described.

7. The combination of a casing, as A, provided with an intake, as D, an interior channel, as L, valve mechanisms, as N, O, an exterior channel, as K, an exit, as E, reciprocating pistons, as F, F, a revolving armature, as T, field-magnets secured to the casing and having their cores projecting through the channels therein, and consequent poles, as B³, formed in the casing and having one of the channels arranged to circulate the fluid through them, all arranged substantially as herein set out and described.

In witness whereof I hereunto set my hand this 9th day of October, 1893.

CYRUS ROBINSON.

Witnesses:
JOHN W. GIBBONEY,
BENJAMIN B. HULL.